(12) United States Patent
Kumar et al.

(10) Patent No.: US 12,422,992 B2
(45) Date of Patent: Sep. 23, 2025

(54) INCREASED THROUGHPUT FOR WRITES TO MEMORY

(71) Applicant: Arm Limited, Cambridge (GB)

(72) Inventors: Akshay Kumar, New Delhi (IN); Rahul Mathur, Austin, TX (US); Edward Martin McCombs, Jr., Austin, TX (US); Sean James Salisbury, Dendron (GB); Andrew David Tune, Dronfield (GB); Gaurav Kumar, Noida (IN)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 18/436,147

(22) Filed: Feb. 8, 2024

(65) Prior Publication Data

US 2025/0258608 A1    Aug. 14, 2025

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ...... G06F 13/161; G06F 3/0611; G06F 3/064; G06F 3/0673
See application file for complete search history.

(56) References Cited

U.S. PATENT DOCUMENTS

| 6,181,612 | B1 | 1/2001 | Wada |
| 7,319,632 | B2 | 1/2008 | Jung |
| 2001/0043482 | A1 | 11/2001 | Takeyama et al. |
| 2019/0198093 | A1 | 6/2019 | Khellah et al. |
| 2020/0098422 | A1 | 3/2020 | Nguyen et al. |
| 2021/0027833 | A1* | 1/2021 | Chowdhury .......... G11C 11/419 |
| 2021/0193196 | A1 | 6/2021 | Augustine et al. |
| 2023/0206995 | A1* | 6/2023 | Schreiber ............ G11C 11/4096 365/230.03 |

FOREIGN PATENT DOCUMENTS

WO    2023034370 A1    3/2023

OTHER PUBLICATIONS

Combined Search and Examination Report issued in GB Application No. 2501081.0, mailed Jun. 23, 2025, 8 pages.
Office Action issued in U.S. Appl. No. 18/436,228, mailed Jul. 25, 2025, 12 pages.
Combined Search and Examination Report issued in United Kingdom Application No. 250182.8, mailed Jul. 1, 2025, 10 pages.

* cited by examiner

Primary Examiner — Yong J Choe
(74) Attorney, Agent, or Firm — Talem IP Law, LLP (57) ABSTRACT

A method for write operations to memory include starting write operations for writing n words in a same row, including loading a first word of the n words during a first clock cycle, where n is an integer greater than 1; loading one or more additional words of the n words, each during a corresponding one or more additional clock cycles; triggering the n words to be stored in the memory; and closing the write operations for the writing of the n words during a final clock cycle, whereby the n words are written in n+1 clock cycles consisting of the first clock cycle, the corresponding one or more additional clock cycles, and the final clock cycle. The write circuitry performing the aforementioned operations can also perform write operations for a single word in two clock cycles.

20 Claims, 5 Drawing Sheets

INCREASED THROUGHPUT FOR WRITES TO MEMORY

BACKGROUND

Random Access Memory (RAM) is a type of volatile memory typically used as the main or primary memory for a processing unit and stores the programs and data that the processing unit is using during execution of a program. Static Random Access Memory (SRAM) is typically the type of memory used for caches. SRAM is generally configured as an array, or matrix, of memory units that are individually addressable. Read and write operations are performed on units of data referred to as words. That is, a word refers to a unit of data used by a particular processor design or instruction set.

In general, wordlines are used to select a row for reading or writing and bitlines carry data to/from a column. For the read operation in SRAM, the address of a storage location for a word is transferred to an address line, a pre-charge circuit is used to bring bitlines to VDD, the wordline is driven high (pre-charge circuit is turned off), the cells storing the data at the storage location pull down one bitline, and a sense circuit on a periphery of the array is activated to capture the value on the bitlines. For the write operation in SRAM, the address of a desired word is transferred to a specific address on the wordline and column, data bits to be stored in the memory are transferred to the bitlines, which are driven by a column driver circuit, and the write control is activated to drive the wordline high (while the column driver stays on) and drive the data into the cells being written.

The speed of a processing unit is determined by how many calculations a processor can perform per clock cycle. However, one limiting factor to the performance of a processing unit is the speed at which the data stored in memory can be read and written. Row and column changes, changing between commands, and other operations can contribute to higher latencies. Identifying mechanisms to reduce the number of clock cycles to deliver data (both to memory as a write operation and to a processing unit as a read operation) continues to be important for performance.

BRIEF SUMMARY

Circuitry and techniques for increased throughput for writes to memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in increased throughput. As described in detail herein, for a blast mode write operation, multiple words are written to a row of memory at a same time once the words are loaded, the wordline is on, and the bitlines are pre-charged, thus reducing the number of clock cycles in which the multiple words are written to memory.

A method for write operations to memory includes starting write operations for writing n words in a same row, including loading a first word of the n words during a first clock cycle, where n is an integer greater than 1; loading one or more additional words of the n words, each during a corresponding one or more additional clock cycles; triggering the n words to be stored in the memory; and closing the write operations for the writing of the n words during a final clock cycle, whereby the n words are written in n+1 clock cycles consisting of the first clock cycle, the corresponding one or more additional clock cycles, and the final clock cycle. The write circuitry performing the aforementioned operations can also perform write operations for a single word, where the single word is loaded during a first clock cycle and triggered to be stored in the memory, and the write operations are closed in a second clock cycle as the final clock cycle.

A memory circuitry can include a wordline driver for a memory, the wordline driver coupled to receive an address and select a corresponding wordline for the memory; write circuitry; and a control circuit for operating the wordline driver and the write circuitry, wherein the control circuit directs the write circuitry to: start write operations for writing n words in a same row, including loading a first word of the n words during a first clock cycle, where n is an integer greater than 1; load one or more additional words of the n words, each during a corresponding one or more additional clock cycles; trigger the n words to be stored in the memory; and close the write operations for the writing of the n words during a final clock cycle, whereby the n words are written in n+1 clock cycles consisting of the first clock cycle, the corresponding one or more additional clock cycles, and the final clock cycle This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Circuitry and techniques for increased throughput for writes to memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in an increased throughput.

As described in detail herein, for a blast mode write operation, in which more than one word is written in an increased throughput manner, multiple words are written to a row of memory at a same time once the words are loaded, the wordline is on, and the bitlines are pre-charged, thus reducing the number of clock cycles in which the multiple words are written to memory.

Typically, when writing a sequence of words to a row of memory, two clock cycles are used to write each word. A first clock cycle in which a word is queued/loaded for the write and a second clock cycle in which the word is written. In some cases, a precharge operation for the bitlines is carried out during the first clock cycle. In some cases, the precharge operation for the bitlines is carried out at the end of the write operation in preparation for writing the next word. Through the described techniques, not only is it possible to remove a clock cycle from the subsequent writes in the row, but there is no need to turn off and on the wordline (or precharge the bitlines) between words. That is, the wordline is turned on once. Then, in each subsequent clock cycle, the data is loaded for the write (e.g., the write queues are captured one by one), and in a final clock cycle, all the data is written at once. In addition, the bitlines can be precharged once for the sequence of writes.

Advantageously, by not precharging the bitlines for each write and not turning off and then back on the wordline for each write, significant power savings can be achieved. Thus, when back-to-back writes occur within the same wordline it is possible to perform the writing of two (or more) words without doing two (or more) separate accesses. This reduces the power by 50-75% by not having to precharge between the accesses.

Figure 1A:
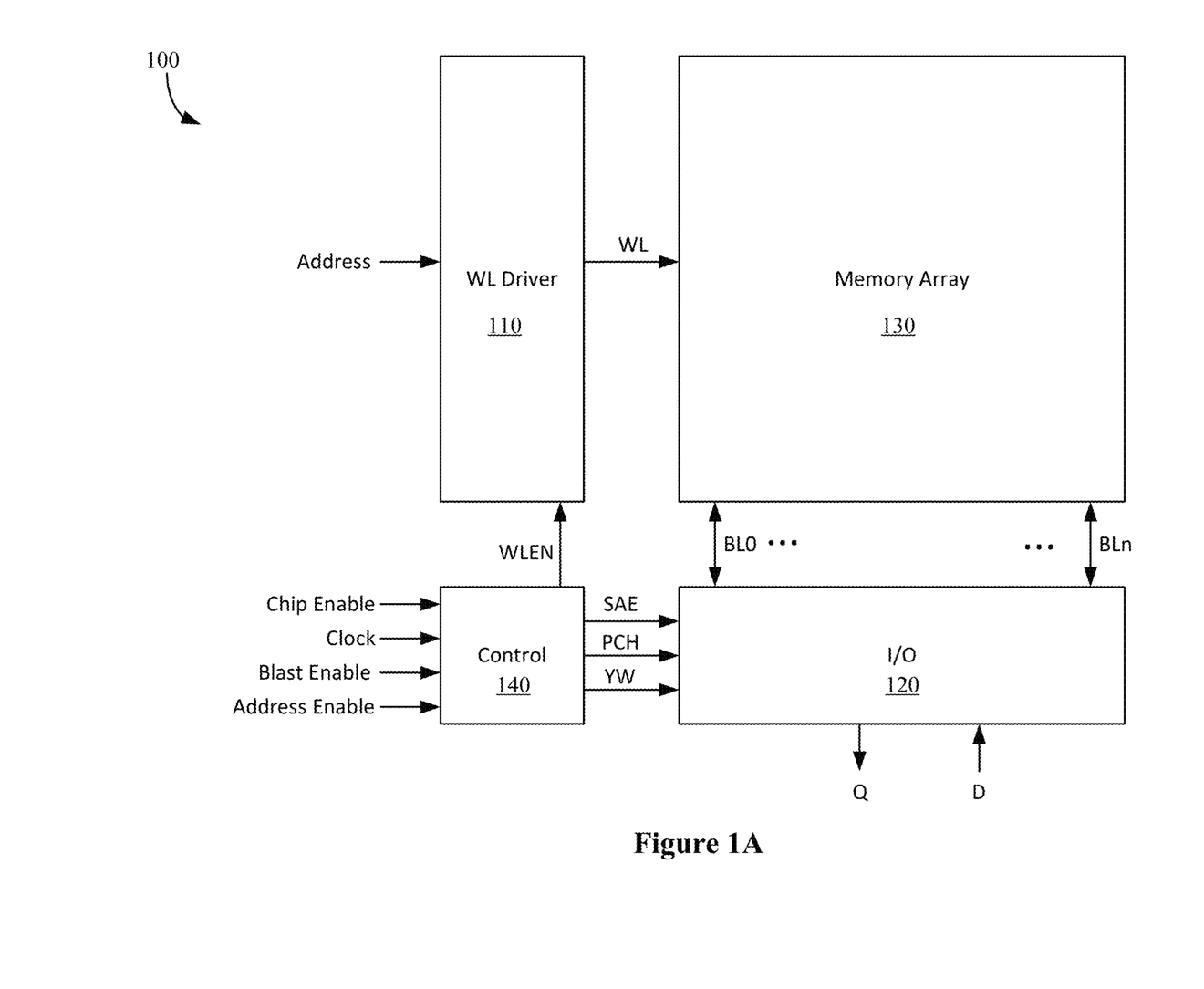
FIG. 1A shows a representational diagram of a memory circuitry.
Figure 1B:
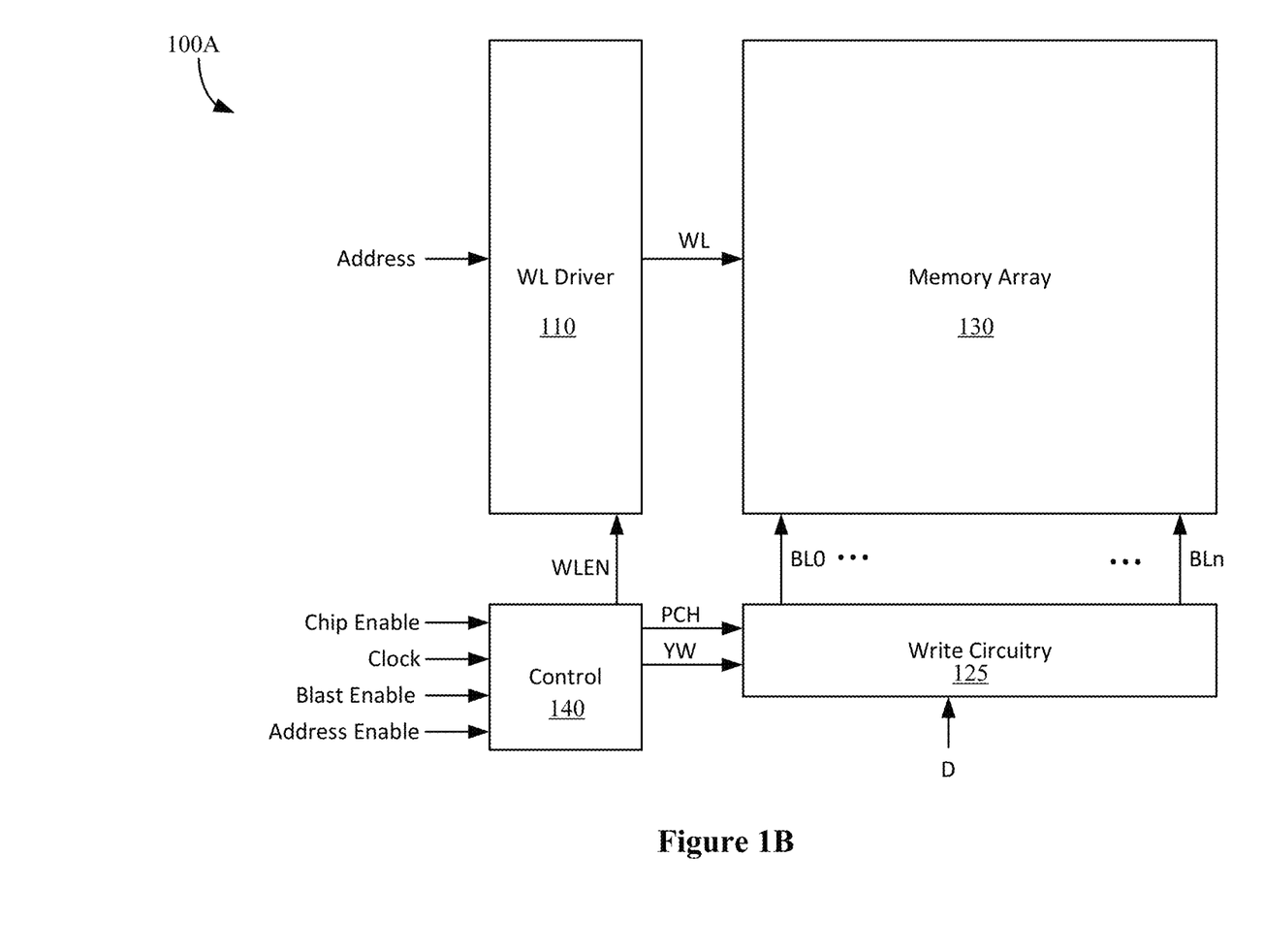
FIG. 1B shows a representational diagram of a memory circuitry for performing write operations.

FIG. 1A shows a representational diagram of a memory circuitry; and FIG. 1B shows a representational diagram of a memory circuitry for performing write operations.

Referring to FIG. 1A, memory circuitry 100 includes a wordline (WL) driver 110 and input/output circuitry 120 for a memory array 130. The WL driver 110 and the input/output circuitry 120 operate under the control of a control circuit 140. In some implementations, the memory circuitry 100 is cache circuitry.

The memory 130 is structured in an array with rows accessed by wordlines and columns accessed by bitlines. In certain implementations, the memory 130 is a static random access memory (SRAM). The structure of each bitcell of the memory can be 1:1:1 bitcells, 1:1:2 bitcells, or 1:2:2 bitcells, as examples. The bitcells may be implemented in FinFET processes, planar processes, nanosheet processes, FDSOI processes, or other suitable technologies. A bitcell refers to the memory element storing a single bit of information.

The control circuit 140 can receive a chip enable signal, a clock signal, a blast enable signal, and an address enable signal and generate outputs to control the WL driver 110 and the I/O circuitry 120. The chip enable signal indicates a start of an operation for memory whether the memory will be accessed or not. The clock signal indicates the start of an operation for memory and provides the operating frequency for the circuitry. The blast enable signal indicates whether the operation being performed at the memory is in blast mode. The address enable signal supports out-of-order bitcell access. Out-of-order bitcell access refers to the ability to write or read (or otherwise access) bitcells on a non-consecutive basis. That is, by using the address enable signal, which indicates which bitlines are going to be accessed during the blast mode, it is possible to have multiple words read or written to non-consecutive bitcells of a row.

The WL driver 110 receives an address and turns on a wordline indicated by the address in response to receiving a wordline enable (WLEN) signal from the control circuit 140.

The input/output circuitry 120 can include write circuitry and read circuitry. Data (D) is received for write operations and Data (Q) is output for read operations. The input/output circuitry 120 receives a sense amplifier enable (SAE) signal, a precharge (PCH) signal, and a write column select (YW) signal from the control circuit 140. In the case of write circuitry 125, the control circuit 140 provides a precharge (PCH) signal and a write column select (YW) signal, as illustrated by the memory circuitry 100A shown in FIG. 1B.

Referring to FIG. 1B, the memory circuitry 100A includes a wordline driver 110 for the memory 130, where the wordline driver 110 is coupled to receive an address and select a corresponding wordline for the memory 130; a write circuitry 125; and a control circuit 140 for operating the wordline driver 110 and the write circuitry 125.

For a blast mode write operation, the control circuit 140 receives a chip enable signal, clock signal, blast enable signal, and address enable signal and, using the received signals, generates appropriate signals to output the wordline enable (WLEN) signal to the wordline driver 110 and output the precharge (PCH) signal and the appropriate write column select (YW) signal to the write circuitry 125. In some cases, the control circuit 140 performs the method 200 described with respect to FIG. 2.

In various implementations, the memory circuitry 100, 100A can also be used to perform a conventional write operations. For example, in response to receiving a signal indicative of a conventional write (e.g., when the blast enable signal does not indicate a blast mode), write operations can be performed for writing one word to the memory, where any word written in response to the signal indicative of the conventional write is written in two clock cycles.

Figure 2:
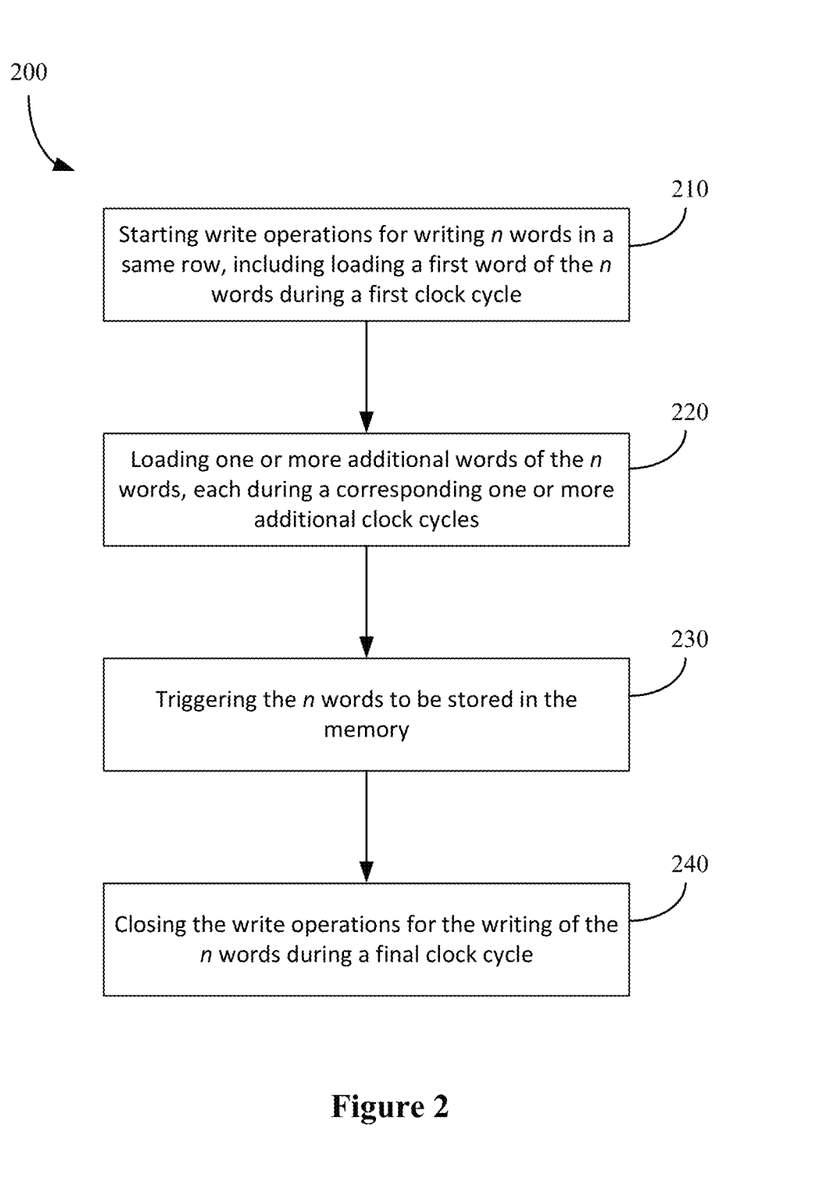
FIG. 2 illustrates a method for write operations to memory for n words in a row.

FIG. 2 illustrates a method for write operations to memory for n words in a row. Referring to FIG. 2, method 200 includes starting (210) write operations for writing n words in a same row, including loading a first word of the n words during a first clock cycle, where n is an integer greater than 1; loading (220) one or more additional words of the n words, each during a corresponding one or more additional clock cycles; triggering (230) the n words to be stored in the memory; and closing (240) the write operations for the writing of the n words during a final clock cycle, whereby the n words are written in n+1 clock cycles consisting of the first clock cycle, the corresponding one or more additional clock cycles, and the final clock cycle.

The starting (210) of the write operations for the writing of n words in the same row can include precharging bitlines of the memory and turning on a wordline. In some cases, the starting (210) of the write operations for the writing of n words in the same row is performed in response to receiving a signal indicative of a blast write, for example, when the blast enable signal received by the control circuit 140 of FIG. 1B indicates the operation is to be a blast operation. The loading of the first word of the n words during the first clock cycle is performed through a data input to the write circuitry (e.g., write circuitry 125 of FIG. 1B).

The loading (220) of one or more additional words of the n words, each during a corresponding one or more additional clock cycles can be performed through the data input to the write circuitry (e.g., write circuitry 125 of FIG. 1B).

Figure 3A:
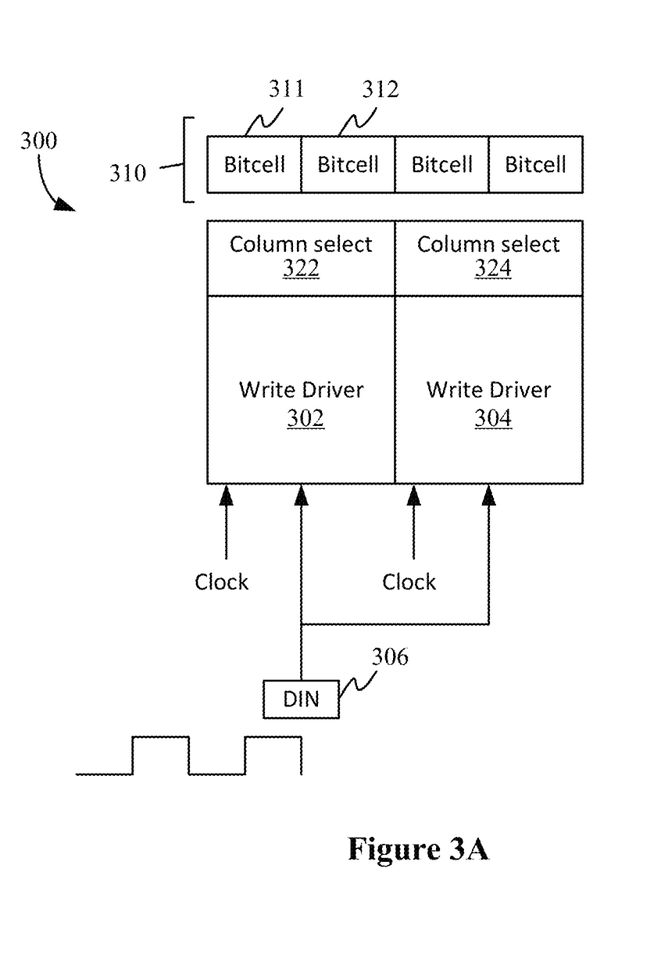
FIGS. 3A and 3B illustrate an example write circuitry supporting n=2 and corresponding timing diagram.
Figure 3B:
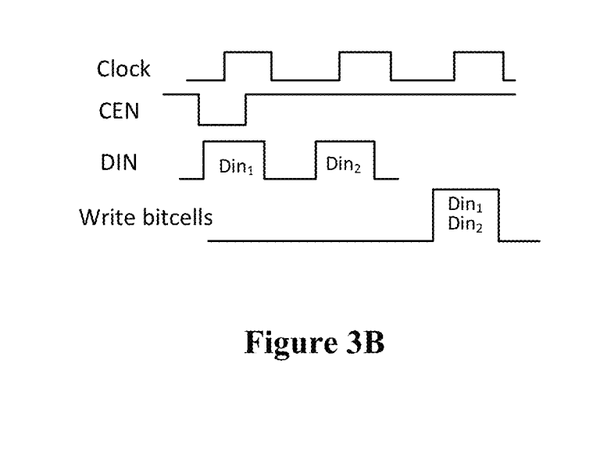
Figure 4A:
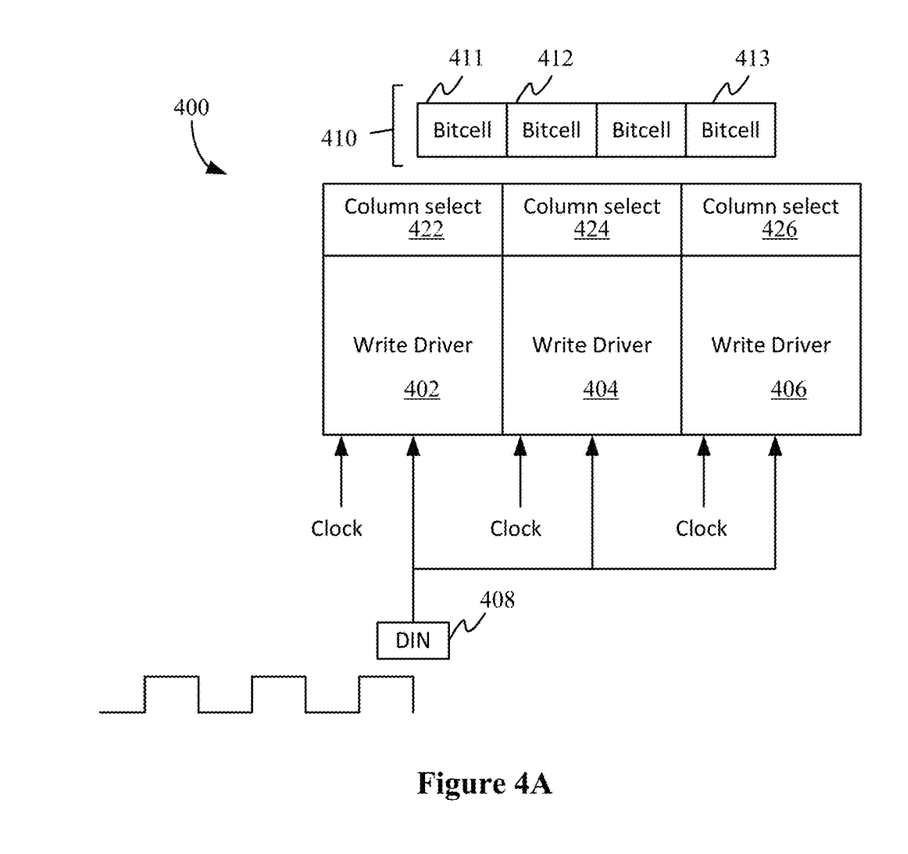
FIGS. 4A and 4B illustrate an example write circuitry supporting n=3 and corresponding timing diagram.
Figure 4B:
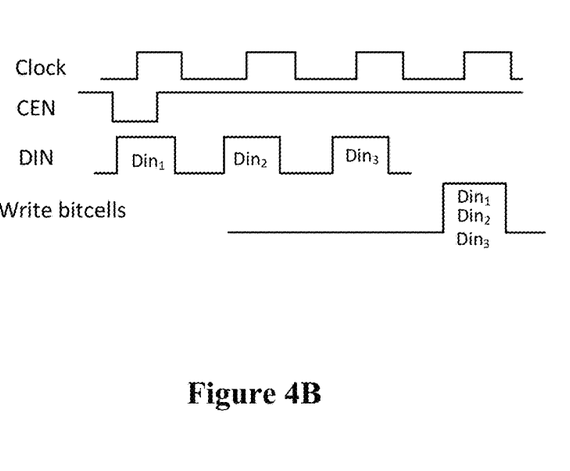

The triggering (230) of the n words to be stored in the memory involves various signals associated with the triggering of the n words to be stored in the memory. For example, the various signals can include applying column select signals and any write driver enable signals (including for boost/write assist circuitry when utilized for controlling a level of an internal voltage). Column select signals can be applied to column select circuitry to select a column to write to. Non-limiting example configurations of column select circuitry include 4:1 multiplexer (MUX), 8:1 MUX, 3:1 MUX, and 2:1 MUX. As described herein, it is possible for all the words to be stored at the same time through, for example, the inclusion of additional write drivers and corresponding additional column select circuitry for a set of bitlines such as illustrated in FIGS. 3A and 4A. With such a configuration, the n words can be triggered to be stored in the memory during a last clock cycle of the corresponding one or more additional clock cycles such that the n words are concurrently stored during the final clock cycle such as illustrated in FIGS. 3B and 4B. It should be noted that the described circuitry for a set of bitcells/set of bitlines/set of columns may represent a single slice (i.e., one bit deep) of a word.

The closing (240) of the write operations for the writing of the n words can include turning off the wordline and the signals associated with the triggering of the n words to be stored in the memory.

FIGS. 3A and 3B illustrate an example write circuitry supporting n=2 and corresponding timing diagram. Referring to FIG. 3A, a two-word (n=2) configuration 300 for write circuitry 125 can include a first write driver 302 to a set of bitlines and a second write driver 304 to the set of bitlines. The first write driver 302 and the second write driver 304 can each be selectively coupled to all the bitlines of the set of bitlines or subsets (including overlapping subsets) of the bitlines of the set of bitlines. Both the first write driver 302 and the second write driver 304 receive their input through the data input (DIN) 306 for the set of bitlines. In the illustrated scenario, the two-word configuration 300 involves a selection of two bitcells from four bitcells 310 in a same row that are accessible by the set of bitlines coupled to the first write driver 302 and the second write driver 304. To select between the bitcells, column select circuitry is included for each write driver. The column select circuitry can select between one, two, three, or more bitlines of the set of bitlines, depending on implementation.

As illustrated in FIG. 3A, the write circuitry can include a first column select circuitry 322 for selecting a particular bitline of the set of bitlines for the first write driver 302 and a second column select circuitry 324 for selecting a corresponding particular bitline of the set of bitlines for the second write driver 304 such that the first word is written to one bitcell (e.g., bitcell 311) coupled to the particular bitline and the second word is written to another bitcell (e.g., bitcell 312) coupled to the corresponding particular bitline. The particular bitline selected by the first column select circuitry 322 is the selected bitline pair (i.e., bitline and bitline bar) for the first write driver 302. The corresponding particular bitline selected by the second column select circuitry 324 is the selected bitline pair for/corresponding to the second write driver 304. The column select circuitry (e.g., first column select circuitry 322, second column select circuitry 324) can be implemented as a MUX. In some cases, the column select circuitry is implemented using pass gates.

Referring to FIG. 3B, for a blast write operation, when a control circuit such as control circuit 140 of FIG. 1A receives a chip enable (CEN) signal indicating a start of the write operations for writing two words in a same row, a first word (Din1) is loaded during the first clock cycle. Then, a second word (Din2) is loaded during the second clock cycle, and the two words (Din1, Din2) are triggered to be stored in the memory such that both words are concurrently written by the end of the third clock cycle. As can be seen, the write operations for the two words are performed in three clock cycles such that the first word (Din1) of the two words is loaded during the first clock cycle, a second word (Din2) of the two words is loaded during a second clock cycle and the write operations close during a third clock cycle during which the two words (Din1, Din2) are stored in the memory.

FIGS. 4A and 4B illustrate an example write circuitry supporting n=3 and corresponding timing diagram. Referring to FIG. 4A, a three-word (n=3) configuration 400 for write circuitry 125 can include a first write driver 402 to a set of bitlines, a second write driver 404 to the set of bitlines, and a third write driver 406 to the set of bitlines. The first write driver 402, the second write driver 404, and the third write driver 406 can each be selectively coupled to all the bitlines of the set of bitlines or subsets (including overlapping subsets) of the bitlines of the set of bitlines. The first write driver 402, the second write driver 404, and the third write driver 406 all receive their input through the data input (DIN) 408 for the set of bitlines. In the illustrated scenario, the three-word configuration 400 involves a selection three bitcells from four bitcells 410 in a same row that are accessible by the set of bitlines coupled to the first write driver 402, the second write driver 404, and the third write driver 406. To select between the bitcells, column select circuitry is included for each write driver. The column select circuitry can select between one, two, three, or more bitlines of the set of bitlines, depending on implementation.

As illustrated in FIG. 4A, the write circuitry can include a first column select circuitry 422 for selecting a particular bitline of the set of bitlines for the first write driver 402, a second column select circuitry 424 for selecting a corresponding particular bitline of the set of bitlines for the second write driver 404, and a third column select circuitry 426 for selecting a corresponding particular bitline of the set of bitlines for the third write driver 406 such that the first word is written to one bitcell (e.g., bitcell 411) coupled to the particular bitline, the second word is written to another bitcell (e.g., bitcell 412) coupled to the corresponding particular bitline, and the third word is written to yet another bitcell (e.g., bitcell 413) coupled to the corresponding particular bitline. The particular bitline selected by the first column select circuitry 422 is the selected bitline pair (i.e., bitline and bitline bar) for the first write driver 402. The corresponding particular bitlines of the second and third write driver 404, 406 selected by the second and third column select circuitry 424, 426 are the selected bitline pair for/corresponding to the second write driver 404 and the third write driver 406. The column select circuitry (e.g., first column select circuitry 422, second column select circuitry 424, third column select circuitry 426) can be implemented as a MUX. In some cases, the column select circuitry is implemented using pass gates.

Referring to FIG. 4B, for a blast write operation, when a control circuit such as control circuit 140 of FIG. 1A receives a chip enable (CEN) signal indicating a start of the write operations for writing three words in a same row, a first word (Din1) is loaded during the first clock cycle, a second word (Din2) is loaded during the second clock cycle, and a third word (Din3) is loaded during the third clock cycle. Then, the three words (Din1, Din2, Din3) are triggered to be stored in the memory such that all three words are written by the end of the fourth clock cycle (i.e., concurrently written to memory). As can be seen, the write operations for the three words are performed in four clock cycles such that the first word (Din1) of the three words is loaded during the first clock cycle, a second word (Din2) of the three words is loaded during a second clock cycle, a third word (Din3) of the three words is loaded during a third clock cycle, and the write operations close during a fourth clock cycle during which the three words (Din1, Din2, Din3) are stored in the memory.

Certain embodiments of the illustrated methods and memory circuitry include the following.

Clause 1. A method for write operations to memory, the method comprising: starting write operations for writing n words in a same row, including loading a first word of the n words during a first clock cycle, where n is an integer greater than 1; loading one or more additional words of the n words, each during a corresponding one or more additional clock cycles; triggering the n words to be stored in the memory; and closing the write operations for the writing of the n words during a final clock cycle, whereby the n words are written in n+1 clock cycles consisting of the first clock cycle, the corresponding one or more additional clock cycles, and the final clock cycle.

Clause 2. The method of clause 1, wherein n=2 and the write operations for the two words are performed in three clock cycles such that the first word of the two words is loaded during the first clock cycle, a second word of the two words is loaded during a second clock cycle and the write operations close during a third clock cycle during which the two words are stored in the memory.

Clause 3. The method of clause 1 or 2, wherein write circuitry for the memory comprises a first write driver to a set of bitlines and a second write driver to the set of bitlines.

Clause 4. The method of any preceding clause, wherein the write circuitry further comprises: a first column select circuitry for selecting a particular bitline of the set of bitlines.

Clause 5. The method of any preceding clause, wherein the write circuitry further comprises: a second column select circuitry for selecting a corresponding particular bitline of the set of bitlines.

Clause 6. The method of any preceding clause, wherein the n words are triggered to be concurrently stored in the memory during a last clock cycle of the corresponding one or more additional clock cycles such that the n words are stored during the final clock cycle.

Clause 7. The method of any preceding clause, wherein starting the write operations for the writing of n words in the same row is performed in response to receiving a signal indicative of a blast write, the method further comprising: receiving a signal indicative of a conventional write; and in response to receiving the signal indicative of the conventional write, starting write operations for writing one word to the memory, whereby any word written in response to the signal indicative of the conventional write is written in two clock cycles.

Clause 8. The method of any preceding clause, wherein starting the write operations for the writing of n words in the same row further comprises precharging bitlines of the memory and turning on a wordline; and wherein closing the write operations for the writing of the n words comprises turning off the wordline and signals associated with the triggering of the n words to be stored in the memory.

Clause 9. The method of any preceding clause, wherein the memory is static random access memory (SRAM).

Clause 10. A memory circuitry, comprising: a wordline driver for a memory, the wordline driver coupled to receive an address and select a corresponding wordline for the memory; write circuitry; and a control circuit for operating the wordline driver and the write circuitry, wherein the control circuit directs the write circuitry to: start write operations for writing n words in a same row, including loading a first word of the n words during a first clock cycle, where n is an integer greater than 1; load one or more additional words of the n words, each during a corresponding one or more additional clock cycles; trigger the n words to be stored in the memory; and close the write operations for the writing of the n words during a final clock cycle, whereby the n words are written in n+1 clock cycles consisting of the first clock cycle, the corresponding one or more additional clock cycles, and the final clock cycle.

Clause 11. The memory circuitry of clause 10, wherein n=2 and the write operations for the two words are performed in three cycles such that the first word of the two words is loaded during the first clock cycle, a second word of the two words is loaded during a second clock cycle and the write operations close during a third clock cycle during which the two words are stored in the memory.

Clause 12. The memory circuitry of clause 10 or 11, wherein the write circuitry comprises a first write driver to a set of bitlines and a second write driver to the set of bitlines.

Clause 13. The memory circuitry of any preceding memory circuitry clause, wherein the write circuitry further comprises a first column select circuitry for selecting a particular bitline of the set of bitlines.

Clause 14. The memory circuitry of any preceding memory circuitry clause, wherein the write circuitry further comprises a second column select circuitry for selecting a corresponding particular bitline of the set of bitlines, wherein the first word is written to one bitcell coupled to the particular bitline and an additional word of the one or more additional words is written to another bitcell coupled to the corresponding particular bitline.

Clause 15. The memory circuitry of any preceding memory circuitry clause, wherein the first write driver and the second write driver further comprise write assist circuitry for controlling a level of an internal voltage.

Clause 16. The memory circuitry of any preceding memory circuitry clause, wherein the n words are triggered to be concurrently stored in the memory during a last clock cycle of the corresponding one or more additional clock cycles such that the n words are stored during the final clock cycle.

Clause 17. The memory circuitry of any preceding memory circuitry clause, wherein the control circuit is coupled to receive a chip enable signal, a clock signal, a blast mode enable signal, an address signal and wherein the control circuit is coupled to output to the write circuitry a precharge signal and a write column select signal.

Clause 18. The memory circuitry of any preceding memory circuitry clause, wherein the memory circuitry is cache circuitry.

Clause 19. The memory circuitry of any preceding memory circuitry clause, wherein the memory is static random access memory (SRAM).

Clause 20. The memory circuitry of any preceding memory circuitry clause, wherein starting the write operations for the writing of n words in the same row is performed in response to receiving a signal indicative of a blast write, wherein the control circuit further directs the write circuitry to: receive a signal indicative of a conventional write; and in response to the signal indicative of the conventional write, start write operations for writing one word to the memory, whereby any word written in response to the signal indicative of the conventional write is written in two clock cycles.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A method for write operations to memory, the method comprising:
   starting write operations for writing n words in a same row, including loading a first word of the n words during a first clock cycle, where n is an integer greater than 1;
   loading one or more additional words of the n words, each during a corresponding one or more additional clock cycles;
   triggering the n words to be stored in the memory; and
   closing the write operations for the writing of the n words during a final clock cycle, whereby the n words are written in n+1 clock cycles consisting of the first clock cycle, the corresponding one or more additional clock cycles, and the final clock cycle.

2. The method of claim 1, wherein n=2 and the write operations for the writing of the two words are performed in three clock cycles such that the first word of the two words is loaded during the first clock cycle, a second word of the two words is loaded during a second clock cycle and the write operations close during a third clock cycle during which the two words are stored in the memory.

3. The method of claim 1, wherein write circuitry for the memory comprises a first write driver to a set of bitlines and a second write driver to the set of bitlines.

4. The method of claim 3, wherein the write circuitry further comprises:
   a first column select circuitry for selecting a particular bitline of the set of bitlines.

5. The method of claim 4, wherein the write circuitry further comprises:
   a second column select circuitry for selecting a corresponding particular bitline of the set of bitlines.

6. The method of claim 1, wherein the n words are triggered to be concurrently stored in the memory during a last clock cycle of the corresponding one or more additional clock cycles such that the n words are stored during the final clock cycle.

7. The method of claim 1, wherein starting the write operations for the writing of n words in the same row is performed in response to receiving a signal indicative of a blast write, the method further comprising:
   receiving a signal indicative of a conventional write; and
   in response to receiving the signal indicative of the conventional write, starting write operations for writing one word to the memory, whereby any word written in response to the signal indicative of the conventional write is written in two clock cycles.

8. The method of claim 1, wherein starting the write operations for the writing of n words in the same row further comprises precharging bitlines of the memory and turning on a wordline; and
   wherein closing the write operations for the writing of the n words comprises turning off the wordline and signals associated with the triggering of the n words to be stored in the memory.

9. The method of claim 1, wherein the memory is static random access memory (SRAM).

10. A memory circuitry, comprising:
    a wordline driver for a memory, the wordline driver coupled to receive an address and select a corresponding wordline for the memory;
    write circuitry; and
    a control circuit for operating the wordline driver and the write circuitry, wherein the control circuit directs the write circuitry to:
       start write operations for writing n words in a same row, including loading a first word of the n words during a first clock cycle, where n is an integer greater than 1;
       load one or more additional words of the n words, each during a corresponding one or more additional clock cycles;
       trigger the n words to be stored in the memory; and
       close the write operations for the writing of the n words during a final clock cycle, whereby the n words are written in n+1 clock cycles consisting of the first clock cycle, the corresponding one or more additional clock cycles, and the final clock cycle.

11. The memory circuitry of claim 10, wherein n=2 and the write operations for the writing of the two words are performed in three cycles such that the first word of the two words is loaded during the first clock cycle, a second word of the two words is loaded during a second clock cycle and the write operations close during a third clock cycle during which the two words are stored in the memory.

12. The memory circuitry of claim 10, wherein the write circuitry comprises a first write driver to a set of bitlines and a second write driver to the set of bitlines.

13. The memory circuitry of claim 12, wherein the write circuitry further comprises a first column select circuitry for selecting a particular bitline of the set of bitlines.

14. The memory circuitry of claim 13, wherein the write circuitry further comprises a second column select circuitry for selecting a corresponding particular bitline of the set of bitlines, wherein the first word is written to one bitcell coupled to the particular bitline and an additional word of the one or more additional words is written to another bitcell coupled to the corresponding particular bitline.

15. The memory circuitry of claim 12, wherein the first write driver and the second write driver further comprise write assist circuitry for controlling a level of an internal voltage.

16. The memory circuitry of claim 10, wherein the n words are triggered to be concurrently stored in the memory during a last clock cycle of the corresponding one or more additional clock cycles such that the n words are stored during the final clock cycle.

17. The memory circuitry of claim 10, wherein the control circuit is coupled to receive a chip enable signal, a clock signal, a blast mode enable signal, an address signal and wherein the control circuit is coupled to output to the write circuitry a precharge signal and a write column select signal.

18. The memory circuitry of claim 10, wherein the memory circuitry is cache circuitry.

19. The memory circuitry of claim 10, wherein the memory is static random access memory (SRAM).

20. The memory circuitry of claim 10, wherein starting the write operations for the writing of n words in the same row is performed in response to receiving a signal indicative of a blast write, wherein the control circuit further directs the write circuitry to:
    receive a signal indicative of a conventional write; and
    in response to the signal indicative of the conventional write, start write operations for writing one word to the memory, whereby any word written in response to the signal indicative of the conventional write is written in two clock cycles.

* * * * *